May 10, 1927.

P. N. JOSLIN

ROLLER

Filed Jan. 4, 1924

1,627,561

Inventor:
Pliny N. Joslin.
By Fisher, Towle, Clapp & Isaacs
Attys.

Patented May 10, 1927.

1,627,561

UNITED STATES PATENT OFFICE.

PLINY N. JOSLIN, OF DE KALB, ILLINOIS.

ROLLER.

Application filed January 4, 1924. Serial No. 684,462.

This invention relates to rollers or wheels and more particularly to such as are provided with rubber tires and has for its primary object to provide a roller of the ball bearing type which is simple, durable and economical in construction and advantageous in use.

Further objects are to provide an improved roller construction to support and hold the tire, to provide an improved form of tire, and in general to provide an improved article of the class described.

The many other objects and advantages of my improved roller will be better understood by reference to the following specification when considered in connection with the accompanying drawing illustrating certain selected embodiments thereof, in which:—

Figure 1:
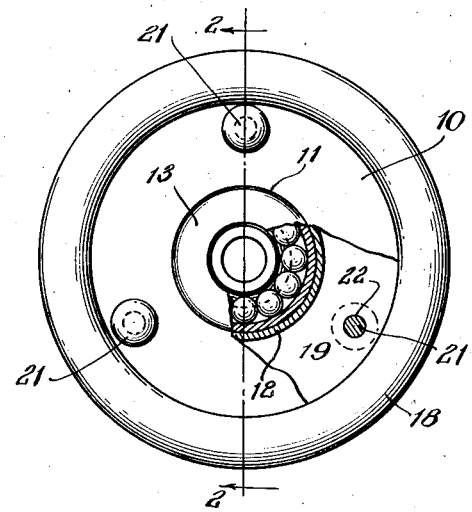
Fig. 1 is a side elevation, partially in section, of a roller.
Figure 2:
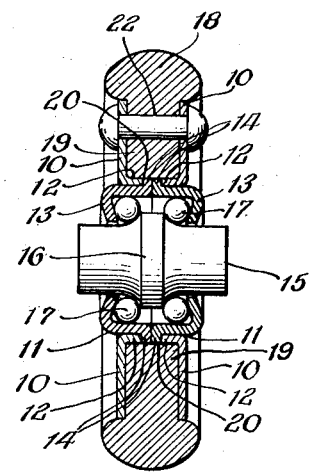
Fig. 2 is a transverse section on the line 2—2 of Fig. 1.
Figure 3:
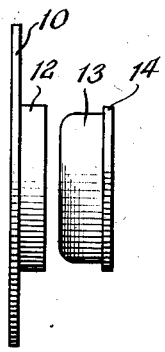
Fig. 3 is a detail view of parts of the roller disassembled.

Referring to the drawing and particularly to Figs. 1 to 3, the roller comprises a pair of substantially flat metal disks or side plates 10 each provided with a central opening 11 and an inwardly directed annular flange 12 surrounding this opening and forming annular shoulders on the inner faces of the plates 10. These flanges 12 form the hub of the roller when the parts are assembled.

A ball cup forming an annular member or ring structure 13 fits within the opening 11 in each of the side plates and is preferably provided with a flange or lip 14 which abuts the edge of the flange 12 on that plate. A shaft 15 extends through the ball cups and this is preferably hollow to admit the usual axle of the roller (not shown). The central portion 16 of this shaft is raised to form a bearing for the two rows of balls 17, one row being disposed on each side thereof in the cups 13.

The tire 18 is formed of rubber, rubberized fabric, fiber or other suitable material and is provided with a rib or annular part 19 which lies between the side plates 10 and is gripped thereby when the roller is assembled. This rib preferably snugly fits about or on the inturned flanges or shoulders 12 on the inner faces of the plates 10 forming the hub of the roller, as at 20, so that the tire is at all times supported thereby. This is a very important feature. The radial strain produced by the rolling action of the tire in turning corners is practically entirely taken up by these flanges.

In practice it has heretofore been found that one of the most serious objections to rubber tires on rollers of this type and particularly those of roller skates was the tendency of these tires to work loose on the roller. This soon rendered the roller unserviceable. My improved construction has entirely eliminated this objectionable feature.

The parts of the roller are held together by a series of rivets, bolts or other suitable form of fastenings, as 21, which project through corresponding holes in the oppositely disposed side plates. These fasteners likewise pass through perforations 22 in the rib of the tire and act with the side plates to prevent creeping of the tire. The flat inner faces of the plates 10 firmly grip the tire without tending to crowd the same outwardly. The metal parts of the roller with the exception of the balls, fasteners, and central shaft are preferably stamped from sheet metal.

Figure 5:
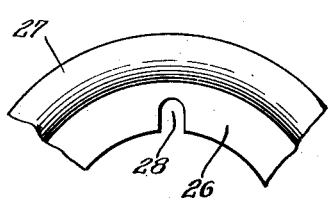
Fig. 5 is a partial side elevation of the tire in the roller shown in Fig. 4.
Figure 4:
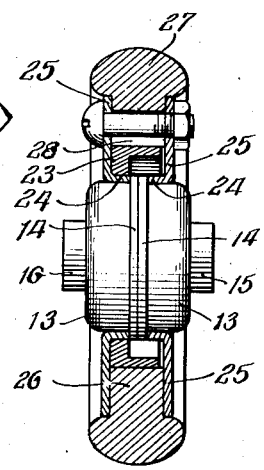
Fig. 4 is a transverse section of a modified form of roller.

In Figs. 4 and 5 is shown a modified form of roller construction in which a ring or annular part, as 23, forming an annular member or ring structure with or without the cups 13 is interposed between the inturned flanges 24 on the side plates 25 and the inner face of the rib 26 on the tire 27. This ring preferably fits snugly upon one of these flanges and the tire in a similar manner fits upon the ring. The tire is thus supported in the same manner as in the embodiment previously described. Instead of providing perforations in the rib to admit the fasteners, this rib may be notched, as at 28.

It will be obvious from the foregoing description that my improved roller is simple, durable and economical in construction and advantageous in use.

I am aware that the form and arrangement of parts of my roller may be considerably varied without departing from the spirit of my invention, and I reserve the right to make all such changes as fairly fall within the scope of the following claims.

I claim as my invention:

1. As an article of manufacture, a wheel or roller comprising a pair of oppositely arranged side plates, an annular member inwardly of and having flanges disposed between the inner portions of said plates and concentric therewith, and a tire projecting between said plates and seated upon said member.

2. As an article of manufacture, a wheel or roller comprising a pair of oppositely arranged side plates, an annular shoulder formed on the inner face of one of said plates, and a tire extending inwardly and filling the space between said plates and fitting on said shoulder.

3. As an article of manufacture, a wheel or roller comprising a pair of oppositely arranged side plates each provided with an inwardly directed annular flange concentric with the plate, a tire extending between said plates and fitting about and on said flanges, and fastening means extending through said plates.

4. As an article of manufacture, a wheel or roller comprising a pair of oppositely arranged substantially flat disks each provided with an inwardly directed annular flange concentric with the disk, a tire provided with an inwardly projecting rib extending between said disks and fitting snugly about and on said flanges, and fastening means connecting said disks.

5. As an article of manufacture, a wheel or roller comprising a pair of oppositely arranged disks each provided with an inwardly directed annular flange concentric with the disk, a tire provided with a rib projecting between said disks and fitting snugly about and on said flanges, and fastening means extending through said disks and said rib.

6. As an article of manufacture, a wheel or roller comprising a pair of oppositely arranged side plates having flangeless outer edges, an annular shoulder formed on the inner face of one of said plates, a tire extending between said plates, and a cushion tire having a tread portion and an annular part fitting on said shoulder.

7. As an article of manufacture, a wheel or roller comprising a pair of oppositely arranged side plates each provided with an inwardly directed annular flange concentric with the plate, a tire extending snugly between said plates, said tire having a tread portion and an annular part fitting about said flanges, and fastening means extending through said plates.

8. As an article of manufacture, a wheel or roller comprising a pair of oppositely arranged disks each provided with an inwardly directed annular flange concentric with the disk, a tire provided with a tread having shoulders engaging the outer edges of the disks and a rib projecting between said disks and a portion engaging a flange, and fastening means extending through said disks and said rib.

9. As an article of manufacture, a roller comprising a pair of oppositely disposed disks each provided with a central opening and an inwardly directed annular flange about said opening forming a portion of the hub of the roller, a tire extending between said disks, ball cups fitting within the openings in the disks and having abutting flanges between the inner edges of the flanges of the disks, a shaft extending through said cups, and bearing balls interposed between said cups and said shaft.

10. As an article of manufacture, a wheel or roller comprising a pair of oppositely arranged flat side plates, an annular member disposed between said plates and concentric therewith, and a cushion tire having a rib projecting between said plates and seated upon said member.

11. As an article of manufacture, a wheel or roller comprising a pair of oppositely arranged flat side plates having angular inner edges, an annular member disposed between said edges, and a cushion tire having a reduced portion projecting between the plates and connected thereto.

12. As an article of manufacture, a wheel or roller comprising a pair of oppositely arranged side plates, a ring structure disposed between said plates, a cushion tire projecting inwardly and snugly fitting between said plates and on the ring structure, and means extending through said side plates and tire for securing the side plates together and the tire in position.

13. As an article of manufacture, a wheel or roller comprising a pair of oppositely arranged side plates, an annular shoulder formed on the inner faces of said plates, and a cushion tire extending snugly between said plates and fitting on the shoulder.

14. As an article of manufacture, a wheel or roller comprising a pair of substantially oppositely arranged side plates having annular inner portions, a ring structure disposed between and within said plates and including a bearing, a cushion tire having a rib extending between the plates, and transverse connecting means extending through the plates and the rib.

15. As an article of manufacture, a wheel or roller comprising a pair of oppositely arranged side plates, each provided with a flangeless outer edge, and an inwardly directed annular flange at its inner edge concentric with the plate, a cushion tire having a reduced portion extending between said plates in contact therewith about the outer faces of said flanges, and fastening means extending through said plates and tire.

16. As an article of manufacture, a wheel or roller comprising a pair of oppositely arranged substantially flat disks each provided with a single inwardly directed annular flange at its inner edge, a tire provided with an inwardly projectng rib extending between and contacting with the inner faces of the disks, and fastening means connecting the disks.

17. As an article of manufacture, a wheel or roller comprising a pair of oppositely arranged disks each provided with a lateral inwardly directed annular flange concentric with the disk, a tire provided with a rib projecting between said disks and fitting snugly about said flanges, and fastening means extending through said disks and said rib and constituting the sole means of connection therebetween.

18. As an article of manufacture, a roller comprising a pair of oppositely disposed disks each provided with a central opening and an inwardly directed annular flange about said opening forming a portion of the hub of the roller, a tire extending between said disks and seated on the outer faces of said flanges, ball cups fitting within the openings in said disks, a shaft extending through said cups, and bearing balls interposed between said cups and said shaft.

19. As an article of manufacture, a roller comprising a pair of oppositely disposed disks each provided with a central opening and an inwardly directed annular flange about said opening forming with the corresponding flange on the opposite disk the hub of the roller, a cushion tire extending between said disks and fitting snugly about said hub, ball cups fitting within the openings in said disks, a shaft extending through said cups, and bearing balls interposed between said cups and said shaft.

20. As an article of manufacture, a wheel or roller comprising a pair of oppositely arranged side plates having flangeless outer edges, an annular shoulder formed on the inner face of one of said plates, a tire extending between said plates, and an annular part fitting on said shoulder.

21. As an article of manufacture, a wheel or roller comprising a pair of oppositely arranged side plates each provided with an inwardly directed annular flange concentric with the plate, a tire extending snugly between the inner faces of said plates, an annular part fitting about said flanges, and fastening means extending through said plates.

22. As an article of manufacture, a wheel or roller comprising a pair of oppositely arranged disks each provided with an inwardly directed annular flange concentric with the disk, a tire provided with a tread having shoulders engaging the outer edges of the disks and a rib projecting between said disks, and fastening means extending through said disks and said rib.

23. As an article of manufacture, a roller comprising a pair of oppositely disposed disks each provided with a central opening and an inwardly directed annular flange about said opening forming a portion of the hub of the roller, a cushion tire seated on the outer edges of and extending between said disks, ball cups fitting within the openings in the disks and having abutting flanges between the inner edges of the flanges of the disks, a shaft extending through said cups, and bearing balls interposed between said cups and said shaft.

PLINY N. JOSLIN.